US012798710B2

(12) United States Patent
Shimizu

(10) Patent No.: US 12,798,710 B2
(45) Date of Patent: Nov. 17, 2026

(54) COWLING STRUCTURE

(71) Applicant: SUZUKI MOTOR CORPORATION, Hamamatsu (JP)

(72) Inventor: Yuki Shimizu, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 369 days.

(21) Appl. No.: 18/396,208

(22) Filed: Dec. 26, 2023

(65) Prior Publication Data

US 2024/0262447 A1 Aug. 8, 2024

(30) Foreign Application Priority Data

Feb. 2, 2023 (JP) ................................ 2023-014342

(51) Int. Cl.

*B62J 17/10* (2020.01)
*B62J 6/022* (2020.01)
*B62J 6/025* (2020.01)
*B62J 17/02* (2006.01)

(52) U.S. Cl.

CPC ............... *B62J 17/10* (2020.02); *B62J 6/022* (2020.02); *B62J 6/025* (2020.02); *B62J 17/02* (2013.01)

(58) Field of Classification Search

CPC ... B62J 17/10; B62J 6/025; B62J 6/027; B60J 7/10; B60J 6/025; B60J 6/027
See application file for complete search history.

(56) References Cited

U.S. PATENT DOCUMENTS

2018/0162473 A1* 6/2018 Iwamoto ................. B60Q 1/12

FOREIGN PATENT DOCUMENTS

| | | | | | |
|---|---|---|---|---|---|
| CN | 203439184 | U | * | 2/2014 | B62J 6/025 |
| JP | H 10-147272 | A | | 6/1998 | |
| JP | 3376839 | B2 | * | 2/2003 | B62J 6/027 |
| JP | 2018094946 | A | * | 6/2018 | B62J 6/01 |
| VN | 10017397 | B | * | 10/2017 | |

* cited by examiner

*Primary Examiner* — Daniel J Colilla
(74) *Attorney, Agent, or Firm* — Stein IP, LLC

(57) ABSTRACT

A cowling structure for a straddle-type vehicle. The cowling structure includes a front cowling covering a vehicle front portion from a front side. A lamp unit is installed inside the front cowling. A lower surface of the front cowling is inclined obliquely downward to a rear side. The lower surface is formed with a first ventilation hole through which traveling wind blows. The lamp unit includes a lamp configured to illuminate a front of a vehicle, and an optical axis adjustment portion configured to adjust an optical axis of the lamp. The optical axis adjustment portion is configured to receive an operation with a tool, through the first ventilation hole.

13 Claims, 8 Drawing Sheets

COWLING STRUCTURE

CROSS-REFERENCE TO RELATED APPLICATIONS

This application is based on and claims priority under 35 USC 119 from Japanese Patent Application No. 2023-014342 filed on Feb. 2, 2023, the entire content of which is incorporated herein by reference.

TECHNICAL FIELD

The present disclosure relates to a cowling structure.

BACKGROUND ART

A straddle-type vehicle such as a motorcycle is known in which an optical axis adjustment hole (aiming hole) of a headlamp is formed in a front cowling (for example, see JPH10-147272A). An optical axis adjustment device of the headlamp is installed inside the front cowling described in JPH10-147272A, and a pair of optical axis adjustment holes accessible to the optical axis adjustment device are opened on both side surfaces of the front cowling. A tip end of a driver is inserted from each optical axis adjustment hole of the front cowling, and each of adjustment screws for front-rear adjustment and left-right adjustment of the optical axis adjustment device is rotated by the driver, so that an optical axis of the headlamp is adjusted in upper-lower and left-right directions.

The straddle-type vehicle described in JPH10-147272A is designed to have a high front end portion of the front cowling, in order to reduce traveling wind that blows against an occupant. Therefore, when the traveling wind enters below the front cowling, an upward force is generated in a vehicle front portion, and a load shared by a front wheel may be decreased. In order to reduce a decrease in the load shared by the front wheel, it is necessary to make a front portion of the front cowling into a slant shape so that the front cowling can be pressed downward by the traveling wind, which reduces a degree of freedom in design.

SUMMARY OF INVENTION

Aspect of non-limiting embodiments of the present disclosure relates to provide a cowling structure that can achieve stable traveling without reducing the degree of freedom in design.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a cowling structure for a straddle-type vehicle, the cowling structure including:

- a front cowling covering a vehicle front portion from a front side,
- in which a lamp unit is installed inside the front cowling,
- in which a lower surface of the front cowling is inclined obliquely downward to a rear side,
- in which the lower surface is formed with a first ventilation hole through which traveling wind blows,
- in which the lamp unit includes:
  - a lamp configured to illuminate a front of a vehicle; and
  - an optical axis adjustment portion configured to adjust an optical axis of the lamp, and
- in which the optical axis adjustment portion is configured to receive an operation with a tool, through the first ventilation hole.

BRIEF DESCRIPTION OF DRAWINGS

Exemplary embodiment(s) of the present invention will be described in detail based on the following figures, wherein.

DESCRIPTION OF EMBODIMENTS

In a straddle-type vehicle according to one aspect of the present disclosure, a vehicle front portion is covered with a front cowling from a front side, and a lamp unit is installed inside the front cowling. A lower surface of the front cowling is inclined obliquely downward to a rear side, and the lower surface is formed with a ventilation hole through which traveling wind blows. Due to the ventilation hole, a lift force received by the lower surface of the front cowling from the traveling wind is reduced, and an upward force is less likely to be generated in the vehicle front portion. By increasing the load shared by the front wheel, it is possible to improve ground contact property of the front wheel and achieve stable traveling. It is not necessary to make the front portion of the front cowling into a slant shape, and the degree of freedom in design of the front cowling is not reduced. The lamp unit includes a lamp configured to illuminate a front of a vehicle, and an optical axis adjustment portion configured to adjust an optical axis of the lamp. The optical axis adjustment portion is configured to receive an operation with a tool through the ventilation hole, and the ventilation hole also serves as the optical axis adjustment hole of the upper headlamp, so that it is not necessary to provide extra holes in the front cowling.

EMBODIMENT

Figure 1:
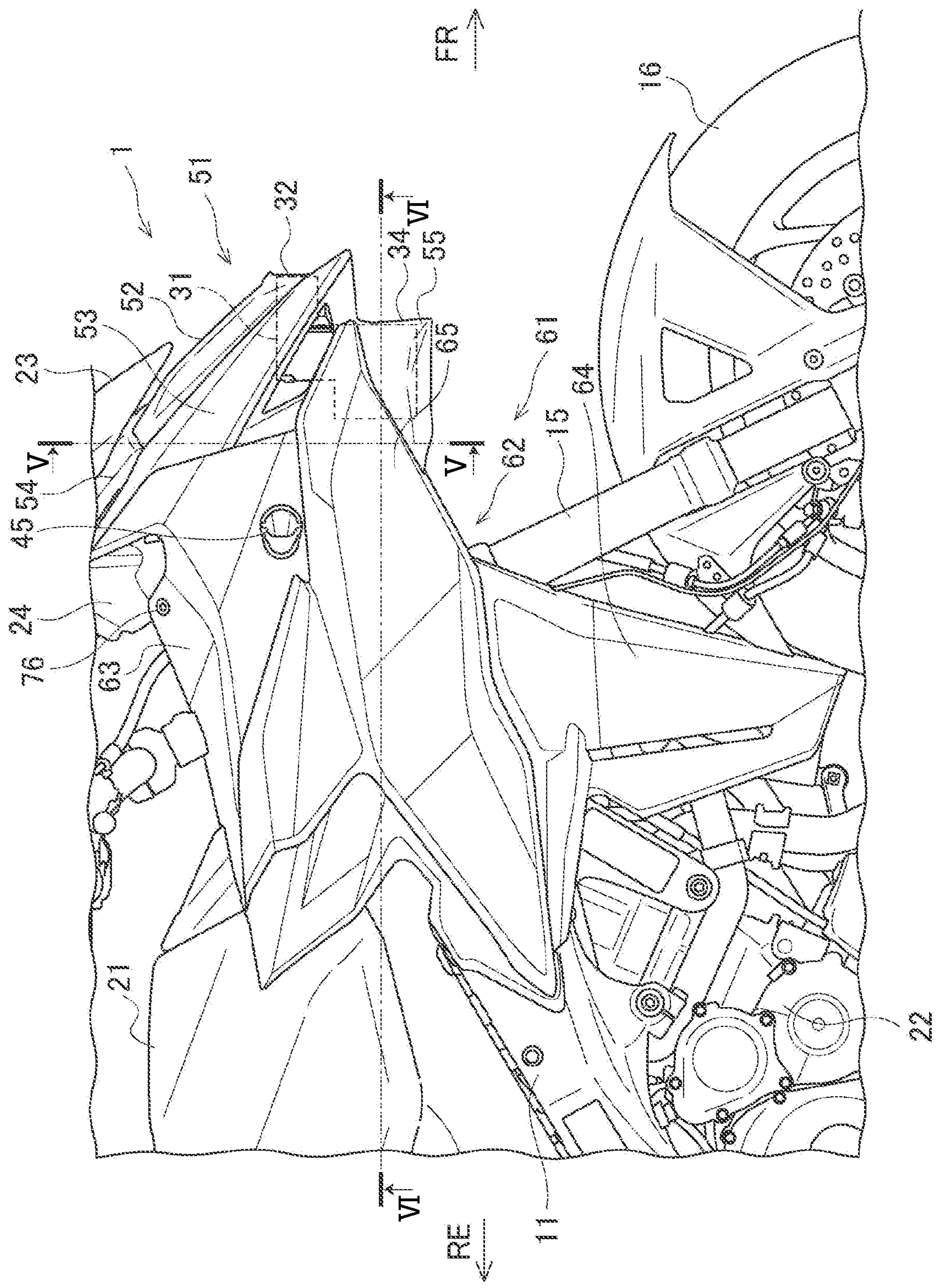
FIG. 1 is a right side view of a vehicle front portion of an exemplary embodiment of the present invention.
Figure 2:
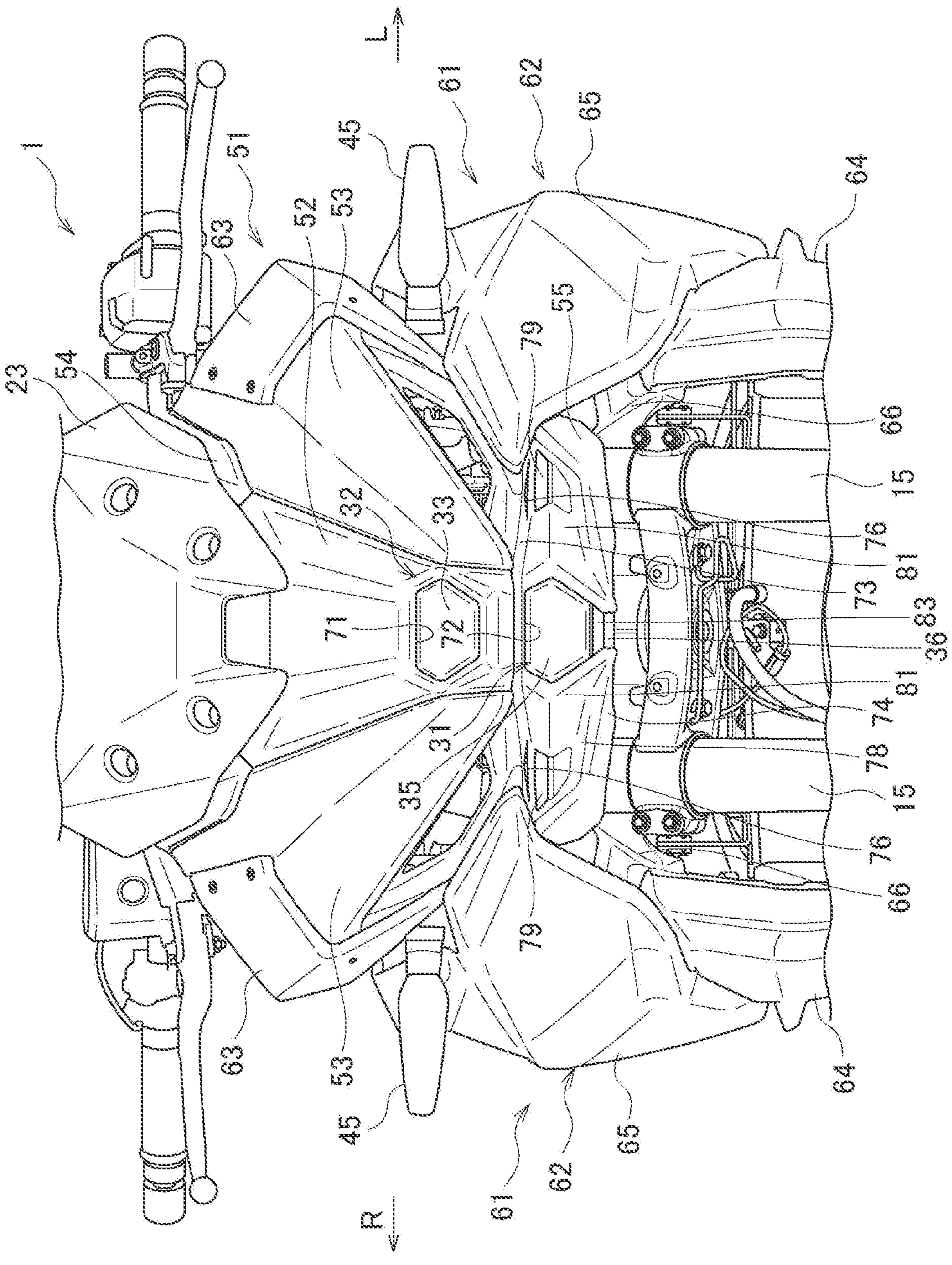
FIG. 2 is a front view of the vehicle front portion of an exemplary embodiment of the present invention.

Hereinafter, a cowling structure according to the present embodiment will be described with reference to the accompanying drawings. FIG. 1 is a right side view of a vehicle front portion of the present embodiment. FIG. 2 is a front view of the vehicle front portion of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowling 51 and a pair of side cowlings 61 are provided at the vehicle front portion of a straddle-type vehicle 1. The vehicle front portion is covered by the front cowling 51 from a front side, and the vehicle front portion is covered by the pair of side cowlings 61 from lateral sides. A front fork 15 protrudes toward a lower side from the side cowling 61, and a front wheel 16 is rotatably supported at a lower portion of the front fork 15. A main frame 11 protrudes toward a rear side from the side cowling 61, a fuel tank 21 is provided on an upper side of the main frame 11, and an engine 22 is provided on the lower side of the main frame 11.

A front end side of the front cowling 51 is formed into a beak shape in a side view. A front surface of the front cowling 51 is inclined obliquely rearward and upward from a front end, and a windscreen 23 for wind protection is attached to the upper side of the front surface of the front cowling 51. A lower surface of the front cowling 51 is formed in two upper and lower stages, and the lower surface on the rear side is one step lower than the lower surface on the front side of the front cowling 51. A meter cover 24 is attached to the rear side of the front cowling 51. A headlamp unit (lamp unit) 31 including an upper headlamp (upper lamp) 32 and a lower headlamp (lower lamp) 34 is located inside the front cowling 51.

The pair of side cowlings 61 extends toward the rear side from the front cowling 51 to the front side of the fuel tank 21, and extends toward the lower side from the front cowling 51 to the rear side of the front wheel 16. Similarly to the front end side of the front cowling 51, a front end side of each side cowling 61 (outer middle cowling 65) is also formed into a beak shape in side view. The upper side of a front edge of each side cowling 61 is inclined obliquely upward and rearward from a front end, and the lower side of the front edge of each side cowling 61 is inclined obliquely downward and rearward from the front end. The pair of side cowlings 61 are connected to the rear side of the front cowling 51, and a streamline shape that reduces air resistance from traveling wind is formed at the vehicle front portion of the straddle-type vehicle 1.

As shown in FIGS. 1 and 2, the center of the front surface of the front cowling 51 is formed by a front center cowling 52, and both left and right sides of the front surface of the front cowling 51 are formed by a pair of front side cowlings 53. The upper side of the front surface of the front cowling 51 is formed by a front upper cowling 54, and the lower side of the front surface of the front cowling 51 is formed by a front lower cowling 55. A lens surface 33 of the upper headlamp 32 is exposed to the front side through an opening of the front center cowling 52. A lens surface 35 of the lower headlamp 34 is exposed to the front side through an opening of the front lower cowling 55.

An outer surface of each of the pair of side cowlings 61 is formed by an outer cowlings 62, and an inner surface of each of the pair of side cowlings 61 is formed by an inner cowlings 66. The outer cowling 62 is formed by combining an outer upper cowling 63, an outer lower cowling 64, and an outer middle cowling 65. A turn signal lamp 45 protrudes laterally from the outer upper cowling 63. The outer cowling 62 and the inner cowling 66 are overlapped in a left-right direction to form each side cowling 61 hollow. A space for accommodating electrical components is secured inside each side cowling 61.

In the straddle-type vehicle 1 described above, the front end of the front cowling 51 is positioned high, in order to protect the occupant from traveling wind. When the traveling wind enters below the front cowling 51, an upward force is easily generated in the vehicle front portion. If the upward force is applied at a location away from the center of gravity of the vehicle, a load shared by the front wheel is significantly decreased, which may result in unstable behavior when driving at high speeds. In this case, a structure is effective in which a hole is provided at a position where the front cowling 51 receives the traveling wind, thereby allowing the traveling wind to escape to the inside of the front cowling 51 to reduce the upward force applied to the vehicle front portion.

On the other hand, a hole for adjusting an optical axis of a lamp is also required in the front cowling 51, but if the hole through which the traveling wind escapes and the hole for adjusting the optical axis are separately formed in the front cowling 51, the number of holes in the front cowling 51 is increased, and the appearance is deteriorated. In order to reduce the upward force without providing a hole in the front cowling 51, it is necessary to make the tip end of the front cowling 51 into a slant shape, but this reduces a degree of freedom in design. Therefore, in the present embodiment, a ventilation hole 76 is formed in the lower surface of the front cowling 51 against which the traveling wind blows, so that the upward force of the vehicle front portion is reduced and the optical axis of the lamp can be adjusted from the ventilation hole 76.

Figure 3:
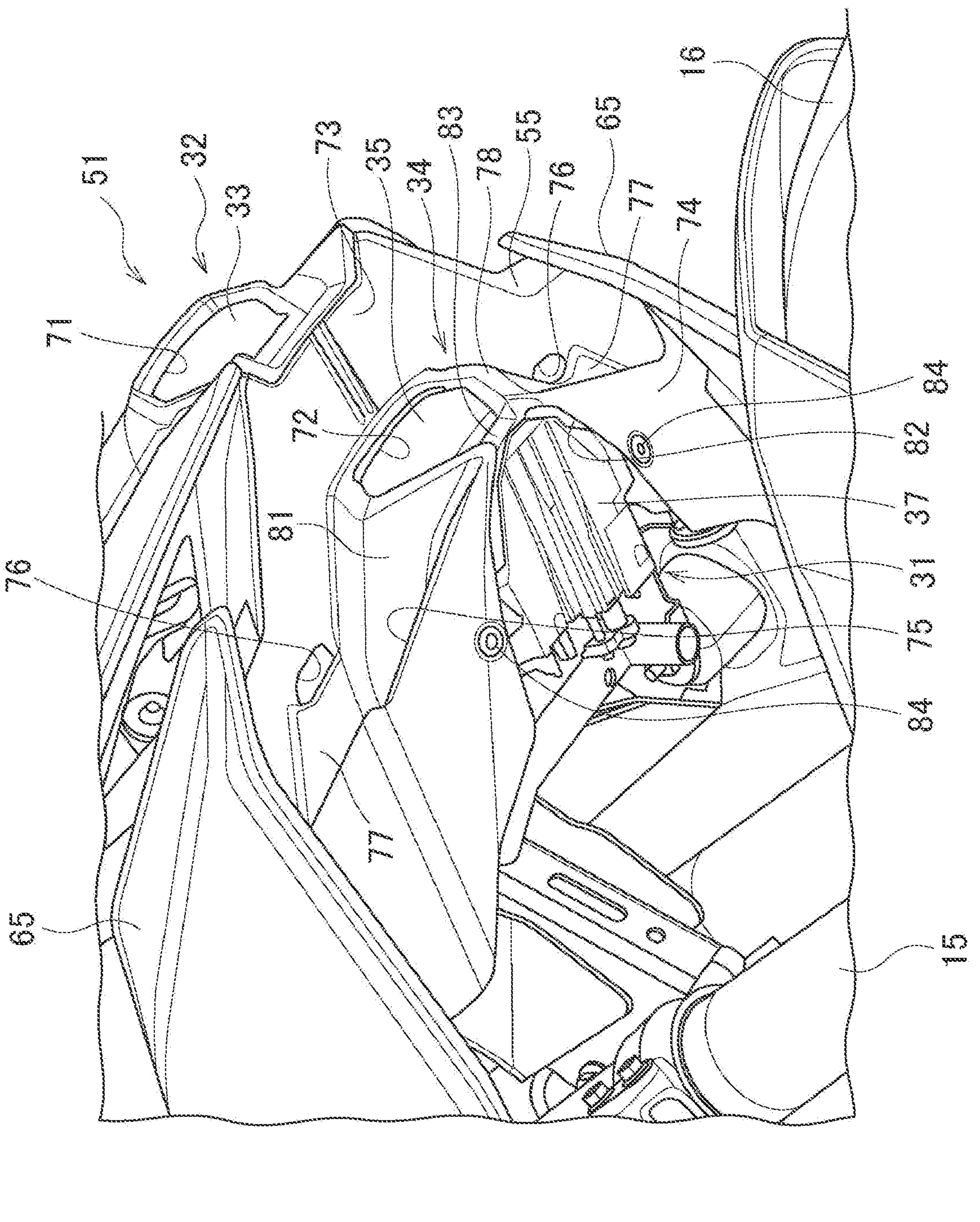
FIG. 3 is a perspective view of the vehicle front portion of an exemplary embodiment of the present invention as viewed obliquely from the lower right.
Figure 4:
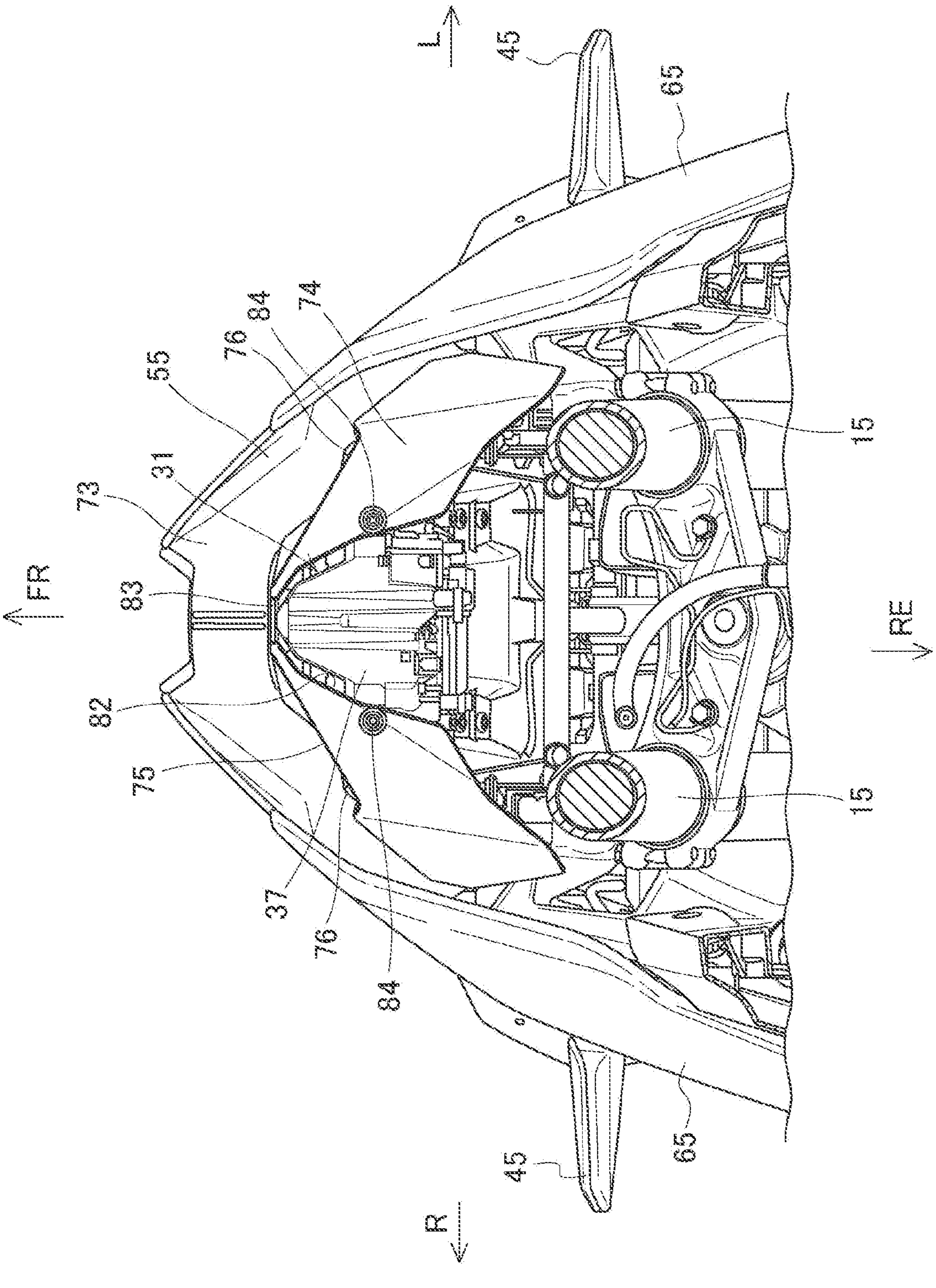
FIG. 4 is a bottom view of the vehicle front portion of an exemplary embodiment of the present invention.
Figure 5:
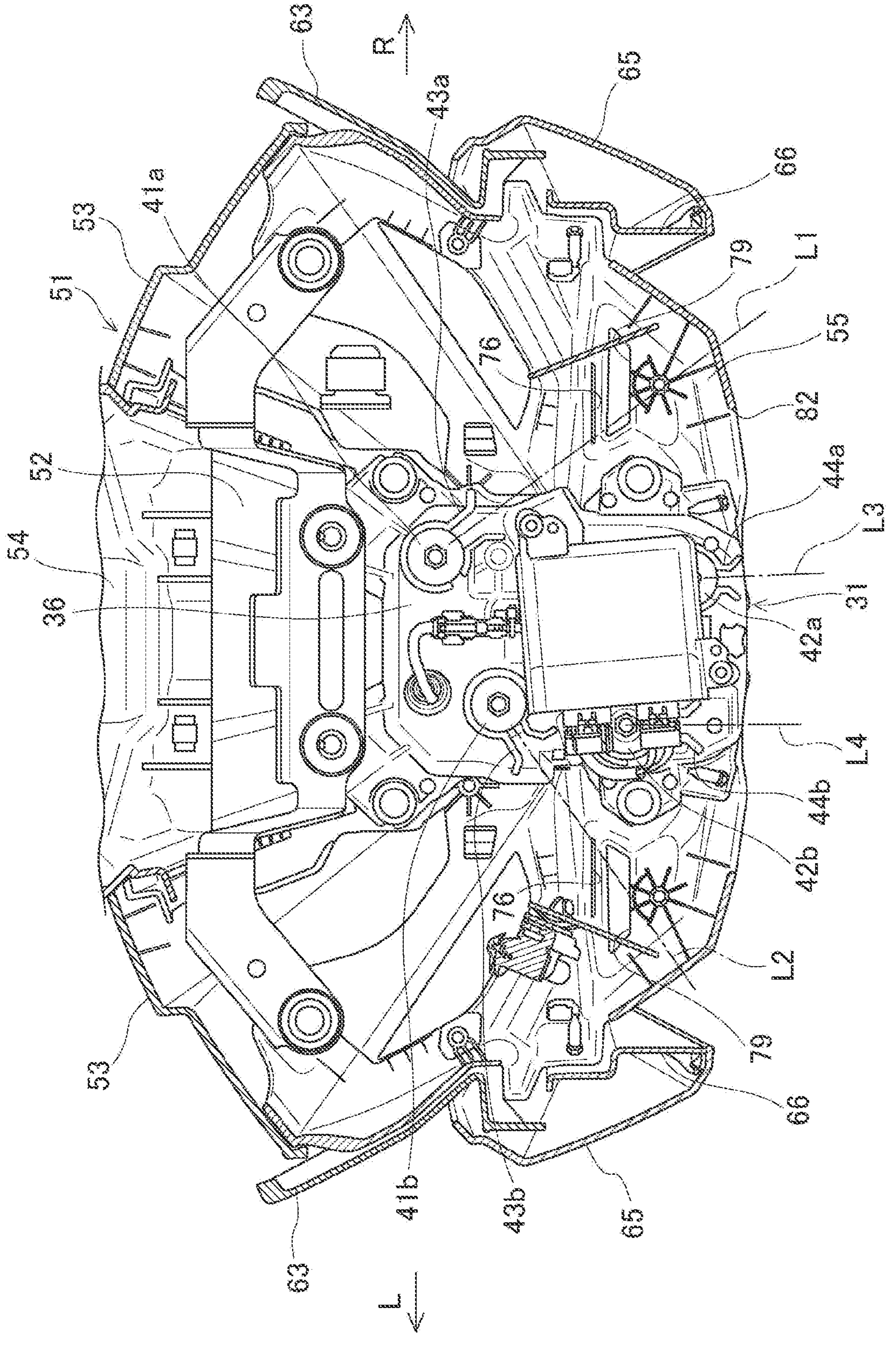
FIG. 5 is a cross-sectional view of the vehicle front portion in FIG. 1 taken along a line V-V.

The cowling structure will be described with reference to FIGS. 2 to 5. FIG. 3 is a perspective view of the vehicle front portion of the embodiment as viewed obliquely from the lower right. FIG. 4 is a bottom view of the vehicle front portion of the embodiment. FIG. 5 is a cross-sectional view of the vehicle front portion in FIG. 1 taken along a line V-V.

As shown in FIGS. 2 and 3, the lens surface 33 of the upper headlamp 32 and the lens surface 35 of the lower headlamp 34 are arranged, along up-down direction, on the front surface of the front cowling 51. The lens surface 33 of the upper headlamp 32 is exposed to the front side through an opening 71 of the front center cowling 52. The lens surface 35 of the lower headlamp 34 is exposed to the front side through an opening 72 of the front lower cowling 55. A lower surface 74 on a lower stage side of the front lower cowling 55 is located on the rear side of a lower surface 73 on an upper stage side. The lens surface 35 of the lower headlamp 34 is located on the rear side of the lens surface 33 of the upper headlamp 32.

The lower surface 73 on the upper stage side of the front lower cowling 55 is inclined obliquely downward to the rear side (see FIG. 1). A pair of ventilation holes 76 are formed in the lower surface 73 on the upper stage side on outer sides, in a vehicle width direction, of the lower headlamp 34. Even if the lower surface 73 on the upper stage side is inclined obliquely downward to the rear side, an upward force is less likely to be generated in the vehicle front portion, since the traveling wind can blow to the rear side through the pair of ventilation holes 76. A protruding portion 77 protrudes downward from the rear side of each of the pair of ventilation holes 76, and the traveling wind easily enters the pair of ventilation holes 76 by the protruding portions 77. The pair of ventilation holes 76 also function as optical axis adjustment holes into which a tool such as a screwdriver is inserted in order to adjust an optical axis of the upper headlamp 32.

A step surface 78 is formed between the lower surface 73 on the upper stage side and the lower surface 74 on the lower stage side of the front lower cowling 55, and the lens surface 35 of the lower headlamp 34 is located at the center of the step surface 78. Both sides of the step surface 78 in the vehicle width direction are recessed toward the rear side across the lens surface 35. A pair of ventilation holes (other ventilation holes) 79 are formed on a back surface of the recess of the step surface 78. The pair of ventilation holes 79 are located on the rear side of the pair of ventilation holes 76. Even if traveling wind enters the recess of the step surface 78 of the front lower cowling 55, an upward force is less likely to be generated in the vehicle front portion, since the traveling wind can blow to the rear side through the pair of ventilation holes 79.

Further, the pair of ventilation holes 76 and the pair of ventilation holes 79 are located on the rear side of the lens surface 35 of the lower headlamp 34. A side cover 81 is formed on the step surface 78 of the front lower cowling 55 to cover the lower headlamp 34 from a lateral side. The side cover 81 is inclined such that the side cover 81 expands from the lens surface 35 toward the pair of ventilation holes 76 and the pair of ventilation holes 79 and expands to the outer side in the vehicle width direction. The side cover 81 is configured to guide the traveling wind toward the pair of ventilation holes 76 and the pair of ventilation holes 79, and the traveling wind easily flows into the pair of ventilation holes 76 and the pair of ventilation holes 79. A lift force that the front lower cowling 55 receives from the traveling wind is reduced, and an upward force is less likely to be generated in the vehicle front portion.

As shown in FIGS. 3 and 4, in a bottom view, a part of the lower surface 74 on the lower stage side of the front lower cowling 55 overlaps the pair of ventilation holes 76. Thus, foreign matters such as sand bounced up due to the front wheel 16 hardly enter the pair of ventilation holes 76. Further, a front edge 75 of the lower surface 74 on the lower stage side expands rearward to the outer side in the vehicle width direction from the center in the vehicle width direction. An inner side, in the vehicle width direction, of the front edge 75 is located on the front side of the pair of ventilation holes 76. An outer side, in the vehicle width direction, of the front edge 75 is located on the rear side of the pair of ventilation holes 76. The traveling wind is rectified by the lower surface 74 on the lower stage side, and the pair of ventilation holes 76 can be easily seen from diagonally below, which improves workability of optical axis adjustment work to be described later.

The lower surface 74 on the lower stage side of the front lower cowling 55 is cut out to expose an entire lower surface 37 of the headlamp unit 31, and the entire lower surface 37 of the headlamp unit 31 fits into a cutout 82 of the lower surface 74 on the lower stage side. The lower side of the headlamp unit 31 is not covered by the front lower cowling 55, and the lower surface 37 of the headlamp unit 31 is exposed to the lower side, thereby improving heat dissipation. At the front end side of the front cowling 51, the headlamp unit 31, which is a heavy object, fits into the cutout 82 of the front lower cowling 55, thereby lowering the center of gravity at the vehicle front portion and improving driving stability.

The opening 72 of the front lower cowling 55 is continuous with the cutout 82, and the lens surface 35 of the lower headlamp 34 is located low. The front lower cowling 55 is formed with a crossing portion 83 crossing the opening 72 along a lower edge of the lens surface 35 of the lower headlamp 34. The crossing portion 83 is located on the rear side of an opening edge of the front lower cowling 55. The crossing portion 83 hides a step between the lens surface 35 of the headlamp unit 31 and a lamp housing 36 or an interface between components, thereby improving appearance (see FIG. 2). Further, a lower side of the opening 72 of the front lower cowling 55 is connected to the crossing portion 83 to increase the rigidity.

The cutout 82 of the front lower cowling 55 is formed to be wider from the front side toward the rear side, and the cutout 82 is the narrowest when viewed from the front side/Thus, exposure of a lower end of the headlamp unit 31 is reduced to the minimum (see FIG. 2). A pair of fixing portions 84 are provided at both side edges, in the vehicle width direction, of the cutout 82 of the front lower cowling 55. The headlamp unit 31 is fixed to the pair of fixing portions 84, and both side edges, in the vehicle width direction, of the cutout 82 of the front lower cowling 55 are connected via the headlamp unit 31. The headlamp unit 31 functions as a bridge, and the rigidity of the cutout lower surface 74 of the front lower cowling 55 is increased.

In the headlamp unit 31 shown in FIG. 5, a lower half portion protrudes to the rear side than an upper half portion of the lamp housing 36. On a back surface of the upper half portion of the lamp housing 36, an upper optical axis adjustment portion 41*a* is provided near an upper right corner, and an upper optical axis adjustment portion 41*b* is provided near the center on the left side. On a back surface of the lower half portion of the lamp housing 36, a lower optical axis adjustment portion 42*a* is provided near a lower right corner, and a lower optical axis adjustment portion 42*b* is provided near the center on the left side. The optical axis of the upper headlamp 32 is adjusted in the upper-lower and left-right directions by the upper optical axis adjustment portions 41*a* and 41*b*. An optical axis of the lower headlamp 34 is adjusted in the upper-lower and left-right directions by the lower optical axis adjustment portions 42*a* and 42*b*.

The upper optical axis adjustment portions 41*a* and 41*b* is configured to receive an operation with a tool (not shown) through the pair of ventilation holes 76, and the lower optical axis adjustment portions 42*a* and 42*b* is configured to receive an operation with a tool through the cutout 82. Upper tool guides 43*a* and 43*b* are provided around the upper optical axis adjustment portions 41*a* and 41*b*. The upper tool guides 43*a* and 43*b* restrict an insertion direction of the tools onto tool lines L1 and L2 connecting the pair of ventilation holes 76 and the upper optical axis adjustment portions 41*a* and 41*b*. Lower tool guides 44*a* and 44*b* are provided around the lower optical axis adjustment portions 42*a* and 42*b*, and the lower tool guides 44*a* and 44*b* restrict the insertion direction of the tools onto the tool lines L3 and L4 connecting the cutout 82 and the lower optical axis adjustment portions 42*a* and 42*b*.

In a case where the tool is inserted from the pair of ventilation holes 76, a tip end of the tool is guided to the upper optical axis adjustment portions 41*a* and 41*b* by the upper tool guides 43*a* and 43*b*. In a case where the tool is inserted from the cutout 82, a tip end of the tool is guided to the lower optical axis adjustment portions 42*a* and 42*b* by the lower tool guides 44*a* and 44*b*. This facilitates the optical axis adjustment work of the upper headlamp 32 and the lower headlamp 34. The pair of ventilation holes 76 serve as optical axis adjustment holes of the upper optical axis adjustment portions 41*a* and 41*b*, and the cutouts 82 serve as optical axis adjustment holes of the lower optical axis adjustment portions 42*a* and 42*b*. Therefore, there is no need to add an optical axis adjustment hole to the front cowling 51, and the appearance of the straddle-type vehicle 1 is improved.

A common cowlings is manufactured by injection molding, in which a mold is filled with a molten resin. The mold is formed with a protruding portion that corresponds to a hole shape of the cowling. When the mold is filled with a molten resin, the molten resin branches to avoid the protruding portion, and the molten resin that has gone around the protruding portion joins together and forms a weld line. For this reason, as the number of holes in the cowling increases, many weld lines appear on the appearance of the unpainted cowling. Since the number of holes of the front lower cowling 55 of the present embodiment is reduced to the minimum, the number of weld lines of the front lower cowling 55 is reduced, so that the appearance of the straddle-type vehicle 1 is improved.

Figure 6:
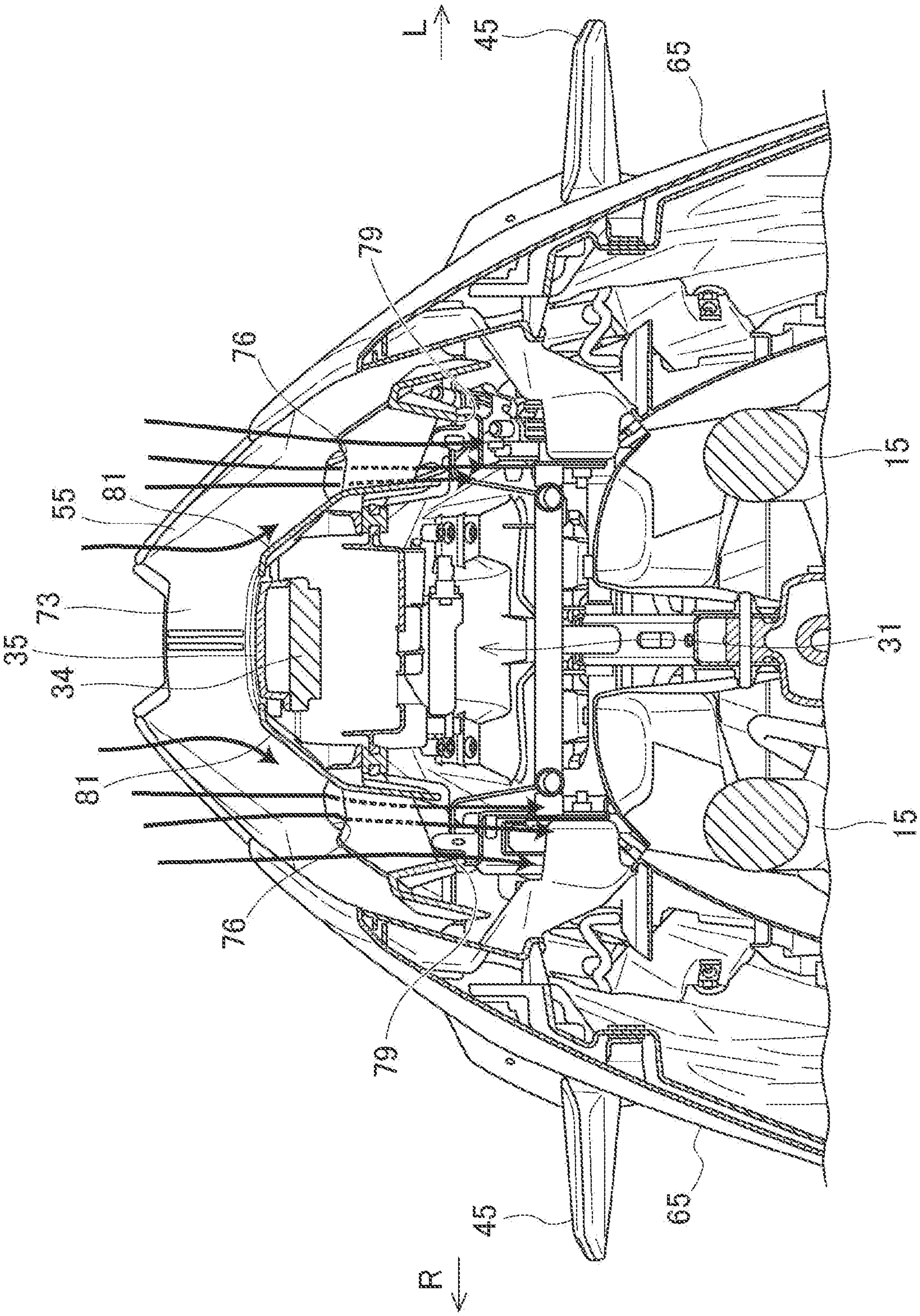
FIG. 6 is a view showing a flow of traveling wind in a cross section of the vehicle front portion in FIG. 1 taken along a line VI-VI.

A flow of traveling wind in the front cowling will be described with reference to FIG. 6. FIG. 6 is a view showing the flow of traveling wind in a cross section of the vehicle front portion in FIG. 1 taken along a line VI-VI.

As shown in FIG. 6, the lower headlamp 34 is accommodated in the center of the front lower cowling 55. On both sides of the lower headlamp 34, the pair of ventilation holes 76 are formed in the lower surface 73 on the upper stage side of the front lower cowling 55. Further, the front lower cowling 55 is recessed on the rear side of the pair of ventilation holes 76, and the pair of ventilation holes 79 are formed on a back surface of the recess of the front lower cowling 55. When the vehicle is traveling, traveling wind enters below the front cowling 51, and the traveling wind flows to the rear side along the lens surface 35 of the lower headlamp 34 and the side cover 81.

The traveling wind enters the inside of the front lower cowling 55 from the pair of ventilation holes 76, and the traveling wind enters the inside of the front lower cowling 55 from the pair of ventilation holes 79. Since the traveling wind blows to the inside of the front lower cowling 55 from the pair of ventilation holes 76 and the pair of ventilation holes 79, a lift force on the lower surface 73 on the upper stage side of the front lower cowling 55 decreases, and an upward force is less likely to be generated at the vehicle front portion. The traveling wind flows to the rear side through both lateral sides of the headlamp unit 31, so that the traveling wind is less likely to flow around to a back surface side of the headlamp unit 31, and electrical components on the back surface side of the headlamp unit 31 are protected from foreign matters and the like carried by the traveling wind.

Figure 7:
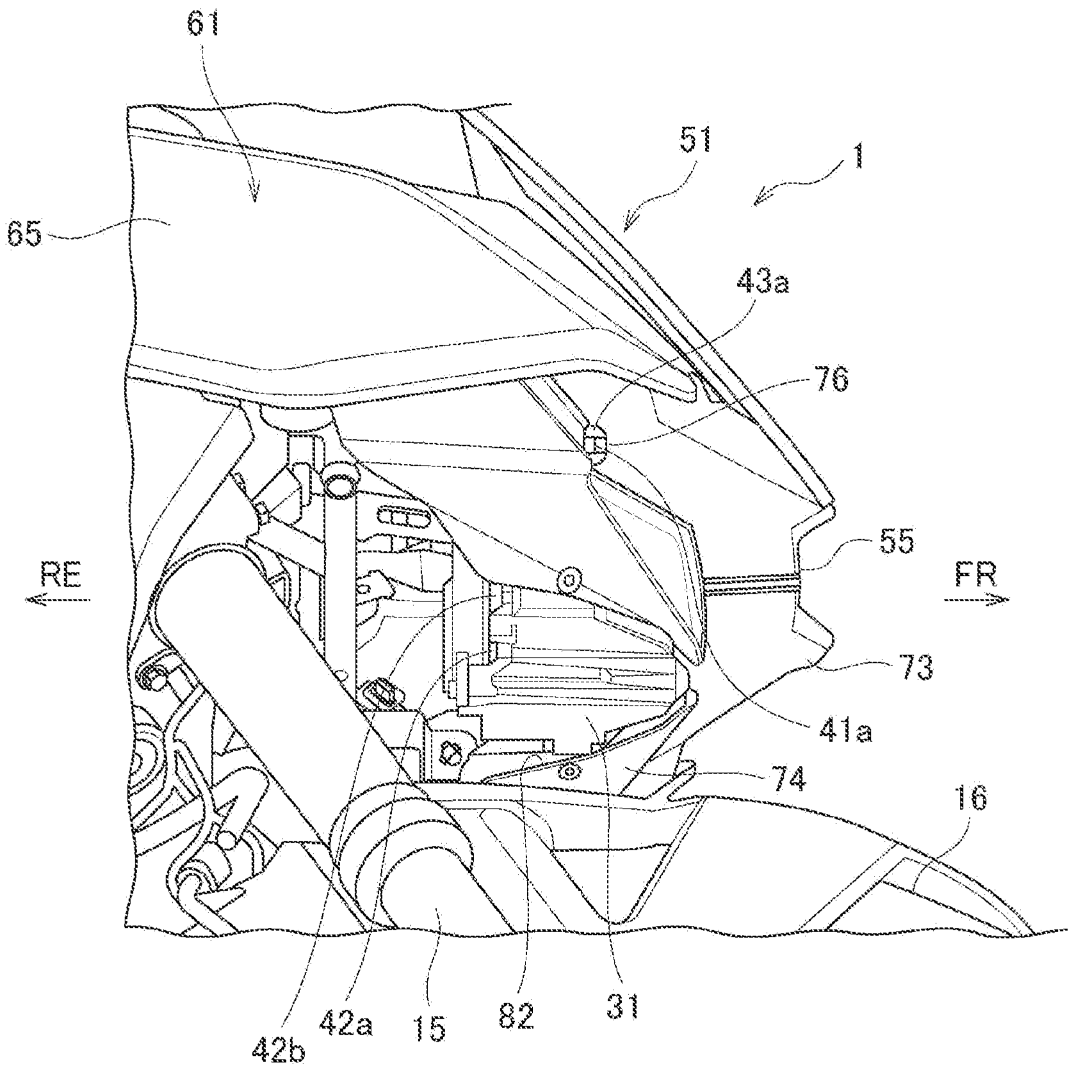
FIG. 7 is a perspective view of the vehicle front portion of an exemplary embodiment of the present invention as viewed obliquely from the lower right.
Figure 8:
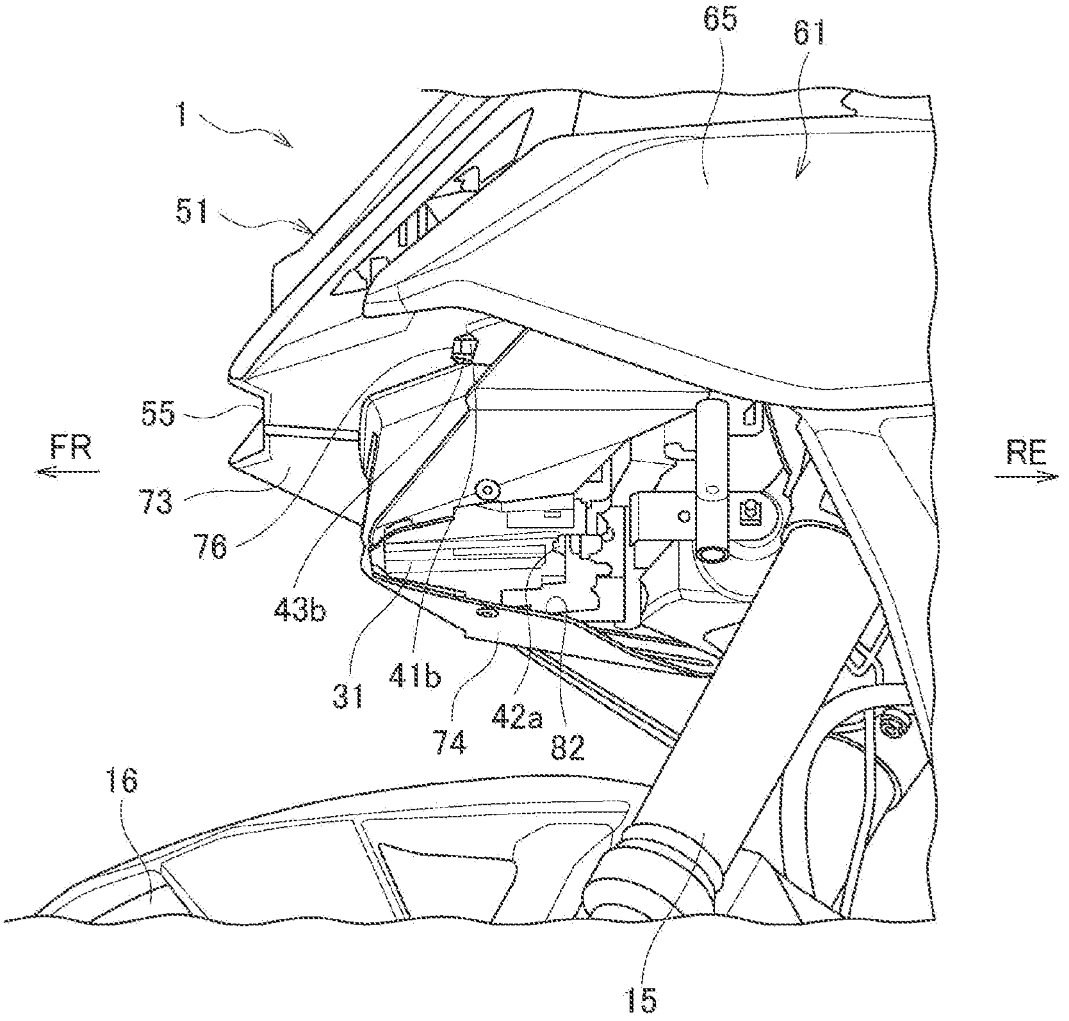
FIG. 8 is a perspective view of the vehicle front portion of an exemplary embodiment of the present invention as viewed obliquely from the lower left.

The optical axis adjustment work of the upper headlamp and the lower headlamp will be described with reference to FIGS. 7 and 8. FIG. 7 is a perspective view of the vehicle front portion of the embodiment as viewed obliquely from the lower right. FIG. 8 is a perspective view of the vehicle front portion of the embodiment as viewed obliquely from the lower left.

As shown in FIG. 7, the ventilation hole 76 on the right side is covered from the lateral side by the side cowling 61, and the ventilation hole 76 is exposed obliquely downward to the right side from the side cowling 61. Since the ventilation hole 76 on the right side is hidden by the side cowling 61 when viewed from the lateral side, the appearance of the straddle-type vehicle 1 is improved. Since the ventilation hole 76 on the right side can be seen from the obliquely lower right side, the tool can be inserted through the ventilation hole 76. When the tool is inserted into the ventilation hole 76 on the right side from obliquely downward to the right, a tip end of the tool is guided by the upper tool guide **43*a* to the upper optical axis adjustment portion 41*a*. Even if the upper optical axis adjustment portion 41*a* is not visually observable, the upper optical axis adjustment portion 41*a*** can be operated with the tool.

As shown in FIG. 8, the ventilation hole 76 on the left side is covered from the lateral side by the side cowling 61, and the ventilation hole 76 is exposed obliquely downward to the left side from the side cowling 61. Since the ventilation hole 76 on the left side is hidden by the side cowling 61 when viewed from the lateral side, the appearance of the straddle-type vehicle 1 is improved. Since the ventilation hole 76 on the left side can be seen from the obliquely lower left side, the tool can be inserted through the ventilation hole 76. When the tool is inserted into the ventilation hole 76 on the left side from obliquely downward to the left, a tip end of the tool is guided by the upper tool guide **43*b* to the upper optical axis adjustment portion 41*b*. Even if the upper optical axis adjustment portion 41*b* is not visually observable, the upper optical axis adjustment portion 41*b*** can be operated with the tool.

As shown in FIGS. 7 and 8, the lower optical axis adjustment portions **42*a* and 42*b* are exposed to the lower side by the cutouts 82 of the front lower cowling 55. In a case where the tool is brought close to the lower optical axis adjustment portions 42*a* and 42*b* from directly below through the cutouts 82 of the front lower cowling 55, a tip end of the tool is guided to the lower optical axis adjustment portions 42*a* and 42*b* by the lower tool guides 44*a* and 44*b* (see FIG. 5). Even if the lower optical axis adjustment portions 42*a* and 42*b* are not visually observable, the lower optical axis adjustment portion 42*a* and 42*b* can be operated with the tool. In this way, the optical axis adjustment of the upper headlamp 32 and the lower headlamp 34** are easily performed, and the maintainability is improved.

As described above, according to the cowling structure of the present embodiment, traveling wind easily blows through the pair of ventilation holes 76 of the front lower cowling 55. Due to the pair of ventilation holes 76, a lift force received by the lower surface 73 of the front lower cowling 55 from traveling wind is reduced, and an upward force is less likely to be generated in the vehicle front portion. By increasing the load shared by the front wheel, it is possible to improve ground contact property of the front wheel 16 and achieve stable traveling. It is not necessary to make the front portion of the front cowling 51 into a slant shape, and the degree of freedom in design of the front cowling 51 is not reduced. Further, since the pair of ventilation holes 76 also serve as the optical axis adjustment holes of the upper headlamp 32, it is not necessary to provide extra holes in the front cowling 51.

In the present embodiment, the front cowling is formed by combining a plurality of cowling members. Alternatively, the front cowling may be formed by one cowling member.

Further, in the present embodiment, the outer cowling is formed by combining a plurality of cowling members. Alternatively, the outer cowling may be formed by one cowling member.

Further, in the present embodiment, the lamp unit includes the upper headlamp and the lower headlamp. Alternatively, the lamp unit may be a single headlamp. Further, the lamp unit is a unit for a headlamp, and the lamp unit may be a unit other than a headlamp.

Further, in the present embodiment, the lower surface of the front cowling is formed in two upper and lower stages. Alternatively, the lower surface of the front cowling may not be formed in a stepped shape.

Further, in the present embodiment, the optical axis adjustment portion is operated with a tool through the pair of ventilation holes. Alternatively, the pair of ventilation holes may be used to install other members by using a tool. In this case, a member may be provided inside the front cowling, a fastening component such as a screw of the member may be exposed to the outside through the ventilation hole, and the fastening component of the member inside the front cowling may be fastened. For example, a sensor for radar support or the like may be provided inside the front cowling, and a fastening component for fixing the sensor through the ventilation hole may be fastened with a tool.

Further, in the present embodiment, the front cowling is formed by the front center cowling, the pair of front side cowlings, the front upper cowling, and the front lower cowling. Alternatively, the front cowling may be formed by six or more cowlings.

Further, the cowling structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, a first aspect relates to a cowling structure for a straddle-type vehicle (1), the cowling structure including: a front cowling (51) covering a vehicle front portion from a front side, in which a lamp unit (headlamp unit 31) is installed inside the front cowling, a lower surface (73) of the front cowling is inclined obliquely downward to a rear side, the lower surface is formed with a first ventilation hole (76) through which traveling wind blows, the lamp unit includes a lamp (upper headlamp 32) configured to illuminate a front of a vehicle, and an optical axis adjustment portion (upper optical axis adjustment portion 41*a*, 41*b*) configured to adjust an optical axis of the lamp, and the optical axis adjustment portion is configured to receive an operation with a tool, through the first ventilation hole. According to this configuration, the traveling wind can easily blow through the ventilation hole in the lower surface of the front cowling. Due to the ventilation hole, a lift force received by the lower surface of the front cowling from the traveling wind is reduced, and an upward force is less likely to be generated in the vehicle front portion. By increasing the load shared by the front wheel, it is possible to improve ground contact property of the front wheel and achieve stable traveling. It is not necessary to make the front portion of the front cowling into a slant shape, and the degree of freedom in design of the front cowling is not reduced. Further, since the ventilation hole also serves as the optical axis adjustment hole of the upper headlamp, it is not necessary to provide extra holes in the front cowling.

A second aspect is directed to the first aspect, in which the lower surface of the front cowling is formed in two upper and lower stages, the lower surface (73) on an upper stage side of the front cowling is inclined obliquely downward to the rear side, the first ventilation hole through which traveling wind blows is formed in the lower surface on the upper stage side of the front cowling, the lamp unit includes an upper lamp (upper headlamp 32) and a lower lamp (lower headlamp 34), which are serving as the lamp, and an upper optical axis adjustment portion (41*a*, 41*b*) and a lower optical axis adjustment portion (42*a*, 42*b*), which are serving as the optical axis adjustment portion, the upper optical axis adjustment portion being configured to adjust optical axes of the upper lamp, the lower optical axis adjustment portion being configured to adjust optical axes of the lower lamp, and the first ventilation hole is formed in the lower surface on the upper stage side of the front cowling on an outer side in a vehicle width direction of the lower lamp, and the upper optical axis adjustment portion is configured to receive an operation with a tool, through the first ventilation hole. According to this configuration, the ventilation hole is brought close to the upper optical axis adjustment portion, so that workability of the optical axis adjustment work of the upper lamp is improved.

A third aspect is directed to the second aspect, in which the first ventilation hole is located behind a lens surface (35) of the lower lamp, a step surface (78) is formed between the lower surface on the upper stage side and the lower surface on a lower stage side of the front cowling, and the step surface is formed with a side cover (81) covering the lower lamp from a lateral side, and the side cover is inclined such that the side cover expands to the outer side in the vehicle width direction and expands from the lens surface toward the first ventilation hole. According to this configuration, the traveling wind is guided toward the ventilation hole by the side cover, and the traveling wind easily flows into the ventilation hole. A lift force that the front cowling receives from the traveling wind is reduced, and an upward force is less likely to be generated in the vehicle front portion. By increasing the load shared by the front wheel, it is possible to improve ground contact property of the front wheel and achieve stable traveling.

A fourth aspect is directed to the second aspect or the third aspect, in which, in a bottom view, a part of the lower surface on a lower stage side of the front cowling overlaps the first ventilation hole. According to this configuration, foreign matters bounced up due to the front wheel hardly enter the ventilation hole.

A fifth aspect is directed to the fourth aspect, in which a front edge (75) of the lower surface on the lower stage side of the front cowling expands rearward from a center in the vehicle width direction to the outer side in the vehicle width direction, an inner side, in the vehicle width direction, of the front edge is located in front of the first ventilation hole, and an outer side, in the vehicle width direction, of the front edge is located behind the first ventilation hole. According to this configuration, the traveling wind is rectified by the lower surface on the lower stage side of the front cowling, and the ventilation hole can be easily seen from diagonally below, which improves workability of the optical axis adjustment work of the upper lamp.

A sixth aspect is directed to any one of the second aspect to the fifth aspect, in which a second ventilation hole (79) is formed in a step surface between the lower surface on the upper stage side of the front cowling and the lower surface on a lower stage side of the front cowling. According to this configuration, due to the another ventilation hole, a lift force received by the lower surface of the front cowling from the traveling wind is reduced, and an upward force is less likely to be generated in the vehicle front portion. By increasing the load shared by the front wheel, it is possible to improve ground contact property of the front wheel and achieve stable traveling.

A seventh aspect is directed to any one of the second aspect to the sixth aspect, in which a pair of side cowlings (61) covering the vehicle front portion from lateral sides are provided, and the first ventilation hole is covered from a lateral side, by the side cowling, and the first ventilation hole is exposed, from the side cowling, obliquely downward on an outer side in a vehicle width direction. According to this configuration, the ventilation hole is hidden by the side cowling when viewed from the lateral side, so that the appearance of the straddle-type vehicle is improved. The workability of the optical axis adjustment is not deteriorated because the ventilation hole is visible from obliquely below on the outer side in the vehicle width direction.

Although the present embodiment has been described, as another embodiment, the above-described embodiment and modification may be combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cowling structure for a straddle-type vehicle, the cowling structure comprising:

a front cowling covering a vehicle front portion from a front side, wherein a lamp unit is installed inside the front cowling, wherein a lower surface of the front cowling is inclined obliquely downward to a rear side, wherein the lower surface is formed with a first ventilation hole through which traveling wind blows, wherein the lamp unit includes:

a lamp configured to illuminate a front of a vehicle; and an optical axis adjustment portion configured to adjust an optical axis of the lamp, and wherein the optical axis adjustment portion is configured to receive an operation with a tool, through the first ventilation hole, and wherein the first ventilation hole is visible in a front view of the vehicle, and the first ventilation hole opens forward.

2. The cowling structure according to claim 1, wherein the lower surface of the front cowling is formed in two upper and lower stages, wherein the lower surface on an upper stage side of the front cowling is inclined obliquely downward to the rear side, wherein the first ventilation hole through which traveling wind blows is formed in the lower surface on the upper stage side of the front cowling, wherein the lamp unit includes:

an upper lamp and a lower lamp, which are serving as the lamp; and an upper optical axis adjustment portion and a lower optical axis adjustment portion, which are serving as the optical axis adjustment portion, the upper optical axis adjustment portion being configured to adjust optical axes of the upper lamp, the lower optical axis adjustment portion being configured to adjust optical axes of the lower lamp, and wherein the first ventilation hole is formed in the lower surface on the upper stage side of the front cowling, on an outer side in a vehicle width direction of the lower lamp, and wherein the upper optical axis adjustment portion is configured to receive an operation with a tool, through the first ventilation hole.

3. The cowling structure according to claim 2, wherein the first ventilation hole is located behind a lens surface of the lower lamp, wherein a step surface is formed between the lower surface on the upper stage side and the lower surface on a lower stage side of the front cowling, and wherein the step surface is formed with a side cover covering the lower lamp from a lateral side, and wherein the side cover is inclined such that the side cover expands to the outer side in the vehicle width direction and expands from the lens surface toward the first ventilation hole.

4. The cowling structure according to claim 2, wherein, in a bottom view, a part of the lower surface on a lower stage side of the front cowling overlaps the first ventilation hole.

5. The cowling structure according to claim 4, wherein a front edge of the lower surface on the lower stage side of the front cowling expands rearward from a center in the vehicle width direction to the outer side in the vehicle width direction, wherein an inner side, in the vehicle width direction, of the front edge is located in front of the first ventilation hole, and wherein an outer side, in the vehicle width direction, of the front edge is located behind the first ventilation hole.

6. The cowling structure according to claim 2, wherein a second ventilation hole is formed in a step surface between the lower surface on the upper stage side of the front cowling and the lower surface on a lower stage side of the front cowling.

7. The cowling structure according to claim 1, further comprising:

a pair of side cowlings covering the vehicle front portion from lateral sides, wherein the first ventilation hole is covered, from a lateral side, by the side cowling, and the first ventilation hole is exposed, from the side cowling, obliquely downward on an outer side in a vehicle width direction.

8. A cowling structure for a straddle-type vehicle, the cowling structure comprising:

a front cowling covering a vehicle front portion from a front side, wherein a lamp unit is installed inside the front cowling, wherein a lower surface of the front cowling is inclined obliquely downward to a rear side, wherein the lower surface is formed with a first ventilation hole through which traveling wind blows, wherein the lamp unit includes:

a lamp configured to illuminate a front of a vehicle; and an optical axis adjustment portion configured to adjust an optical axis of the lamp, wherein the optical axis adjustment portion is configured to receive an operation with a tool, through the first ventilation hole, and wherein, in the front view of the vehicle, the first ventilation hole is formed below the lamp.

9. The cowling structure according to claim 1, wherein a protruding portion protrudes downward from a rear side of the first ventilation hole, the protruding portion is configured to facilitate entry of traveling wind into the first ventilation hole.

10. A cowling structure for a straddle-type vehicle, the cowling structure comprising:

a front cowling covering a vehicle front portion from a front side, wherein a lamp unit is installed inside the front cowling, wherein a lower surface of the front cowling is inclined obliquely downward to a rear side,
wherein the lower surface is formed with a first ventilation hole through which traveling wind blows,
wherein the lamp unit includes:
a lamp configured to illuminate a front of a vehicle; and
an optical axis adjustment portion configured to adjust an optical axis of the lamp, and
wherein the optical axis adjustment portion is configured to receive an operation with a tool, through the first ventilation hole,
wherein the front cowling includes a front lower cowling,
wherein the lower surface of the front cowling is formed in upper and lower stages,
wherein a lower surface on an upper stage side of the front lower cowling is inclined obliquely downward to a rear side,
wherein the first ventilation hole is formed in the lower surface on the upper stage side, and
wherein a lower surface on a rear side of the front cowling is lower than the lower surface on a front side of the front cowling.

11. The cowling structure according to claim 10,
wherein a step surface is formed between the lower surface on the upper stage side of the front lower cowling and the lower surface on a lower stage side of the front lower cowling, and
wherein the second ventilation hole is formed in the step surface.

12. The cowling structure according to claim 10,
wherein, in a bottom view, a part of the lower surface on a lower stage side of the front cowling overlaps the first ventilation hole.

13. The cowling structure according to claim 12,
wherein the front edge of the lower surface on the lower stage side of the front cowling expands rearward from a center in the vehicle width direction to an outer side in the vehicle width direction,
wherein the inner side, in the vehicle width direction, of the front edge is located in front of the first ventilation hole, and
wherein the outer side, in the vehicle width direction, of the front edge is located behind the first ventilation hole.

* * * * *